United States Patent [19]
Thomas

[11] Patent Number: 5,924,282
[45] Date of Patent: Jul. 20, 1999

[54] VEHICLE WITH IMPROVED EXHAUST SYSTEM FOR INTERNAL COMBUSTION ENGINE

[75] Inventor: R. Winfield Thomas, West Lebanon, Ind.

[73] Assignee: Tru-Flex Metal Hose Corp., West Lebanon, Ind.

[21] Appl. No.: 09/009,551

[22] Filed: Jan. 20, 1998

[51] Int. Cl.[6] .................................................. F01N 7/10
[52] U.S. Cl. ............................... 60/323; 60/322; 285/903
[58] Field of Search ...................... 60/322, 323; 285/903, 285/226, 227, 228, 424

[56] References Cited

U.S. PATENT DOCUMENTS

| | | |
|---|---|---|
| 3,490,794 | 1/1970 | Swanson .................................. 60/322 |
| 4,022,019 | 5/1977 | Garcea ..................................... 60/282 |
| 4,113,289 | 9/1978 | Wagner et al. . | 
| 4,312,526 | 1/1982 | Cassel . |
| 4,345,430 | 8/1982 | Pallo et al. ............................... 60/282 |
| 4,536,019 | 8/1985 | Quaranta . |
| 4,629,226 | 12/1986 | Cassel et al. . |
| 5,004,018 | 4/1991 | Bainbridge ............................. 138/149 |
| 5,133,579 | 7/1992 | Anderson et al. . |
| 5,606,857 | 3/1997 | Harada .................................... 60/322 |
| 5,632,513 | 5/1997 | Cassel . |

*Primary Examiner*—F. Daniel Lopez
*Assistant Examiner*—Binh Tran
*Attorney, Agent, or Firm*—Mark E. Brown; Litman, Kraai & Brown LLC

[57] ABSTRACT

A vehicle includes an internal combustion engine and an improved exhaust system including an exhaust pipe connected to the internal combustion engine and a flexible hose connected to the exhaust pipe and to an emission control device. A clamp assembly connects ends of the exhaust pipe and the flexible hose and includes a gasket received within a band subassembly.

12 Claims, 10 Drawing Sheets

VEHICLE WITH IMPROVED EXHAUST SYSTEM FOR INTERNAL COMBUSTION ENGINE

BACKGROUND OF THE INVENTION

1. Field of the Invention

The present invention relates generally to vehicles with internal combustion engines, and in particular to an improved exhaust system therefor.

2. Description of the Prior Art

Exhaust systems transfer the by-products of combustion to the environment via suitable sound and emissions control components, such as mufflers, resonators, catalytic converters and the like. Exhaust systems in general are subjected to relatively harsh operating conditions. For example, high temperature exhaust gases tend to induce thermal stresses, the effects of which are increased by expansion and contraction as the system undergoes temperature change cycles. Exhaust systems installed on vehicles are also subjected to the corrosive effects of ambient operating conditions. Vibration is yet another source of dynamic stress which is commonly encountered by exhaust systems connected to internal combustion engines.

To accommodate dynamic stress induced by vibration and thermal stress induced by temperature differentials, flexible metal hose is often used in exhaust systems. For example, corrugated metal hose is adapted to dissipate heat and dampen vibration-induced dynamic stress, and is further adapted to accommodate expansion and retraction associated with conveying high temperature exhaust gases under conditions which involve significant vibration from combustion engines and from over-the-road operating conditions.

Various methods have previously been proposed for connecting exhaust system components. For example, the components can be welded together, although welded connections tend to make component replacement difficult. Also, welding tends to make some metals and alloys more brittle and more susceptible to rust and corrosion. To simplify exhaust system construction, clamps are often utilized to connect the various components. For example, the Cassel U.S. Pat. No. 4,312,526 discloses a pipe coupling with a stretched, open sleeve. However, heretofore there has not been available a vehicle with an exhaust system with the advantages and features of the present invention.

SUMMARY OF THE INVENTION

In the practice of the present invention, an exhaust system is provided for a vehicle which includes an exhaust pipe and a flexible hose joined in the vicinities of their respective ends by a clamp assembly. The clamp assembly includes a gasket with sections conforming to the configurations of the exhaust pipe and the flexible hose. A band subassembly generally encircles the gasket and securely retains same in place on the exhaust pipe and the flexible hose.

OBJECTS AND ADVANTAGES OF THE INVENTION

The principal objects and advantages of the present invention include: providing a vehicle with an improved exhaust system for an internal combustion engine thereof; providing such a vehicle with an exhaust system with a clamp assembly for connecting an exhaust pipe and a flexible hose; providing such an exhaust system wherein the flexible hose is corrugated; providing such an exhaust system wherein the exhaust pipe is smooth-walled; provide such an exhaust system with a clamp assembly having downstream and upstream sections for engaging the exhaust pipe and the flexible hose respectively; providing such an exhaust system wherein the exhaust pipe and the flexible hose can be joined without welding; providing such an exhaust system which can be installed with a minimum of tools; providing such an exhaust system which can be installed with relatively little training; providing such an exhaust system which can accommodate different end configurations of exhaust pipe and flexible hose; and providing such a vehicle with an exhaust system which is economical to manufacture; efficient in operation, capable of a long operating life and particularly well adjusted for the proposed uses thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENTS

I. Introduction and Environment

Figure 1:
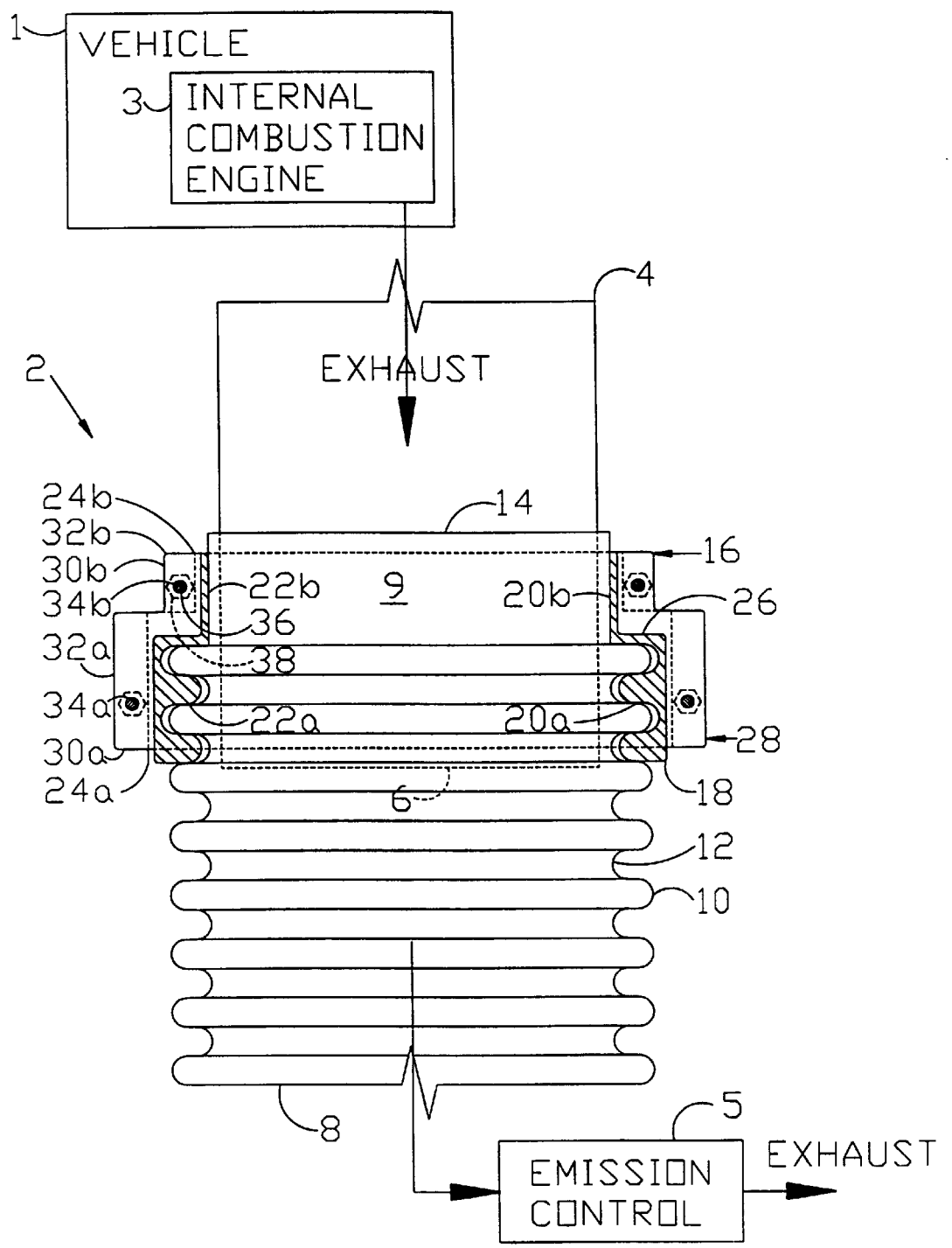
FIG. 1 is a schematic diagram of a vehicle with an improved exhaust system for an internal combustion engine thereof, which embodies the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally designates a vehicle with an improved exhaust system for an internal combustion engine 3. The exhaust system 2 generally includes an exhaust pipe 4 connected to the engine 3 with an exhaust pipe end 6 and a corrugated flexible hose 8 with alternating lands and grooves 10,12 and a flexible hose end 14 at the end of a flexible hose extension 9. The flexible hose 8 is connected to an emission control device 5 (e.g., a muffler, resonator, catalytic converter, etc.) which emits exhaust. A clamp assembly 16 interconnects the exhaust pipe 4 and the flexible hose 8 in proximity to their respective ends 6,14.

The exhaust pipe 4 and the flexible hose 8 are commonly available components in exhaust systems, and other components could be substituted therefor in the practice of the present invention. For example, spiral-wound flexible hose or corrugated hose with helical corrugations could be substituted for the flexible hose 8. The exhaust pipe 4 is shown in an upstream position with respect to the flexible hose 8, i.e., with the exhaust pipe 4 telescopically received within the flexible hose 8 to transfer exhaust gas in a downstream direction.

II. Clamp Assembly 16

The clamp assembly 16 includes a gasket or liner 18 which can comprise for example, a suitable heat-resistant material. The gasket 18 includes upstream and downstream sections 20a,b and a gasket bore with an upstream section 22a having a corrugated configuration corresponding to the corrugated configuration of the flexible hose 8 and a downstream section 22b with a generally smooth-walled configuration. The inside diameter of the gasket bore is slightly less at its upstream section 22b than at its downstream section 22a. The gasket 18 has an outer surface 24 with a generally cylindrical downstream section 24a and a generally cylindrical upstream section 24b. The upstream section 24b has an outer diameter which is less than an outer diameter of the downstream section 24a. The outer surfaces of the gasket sections 24a,b are separated by a gasket shoulder 26 whereat the outer diameters of the gasket sections 24a,b change.

The clamp assembly 16 also includes a band subassembly 28a comprising a pair of band halves 30 each including downstream and upstream sections 30a,b. The band half downstream sections 30a have greater diameters than the upstream sections 30b. Each band half 30 includes a pair of end flanges with downstream and upstream sections 32a,b having downstream and upstream receivers 34a,b respectively. The band halves 30 can be secured together to encircle the gasket 18 by extending respective bolts 36 through aligned receiver pairs 34a,b and threadably mounting nuts 38 on respective bolts 36 for drawing the band halves 30 together at their end flanges 32.

The end 14 of the flexible hose 8 is located in proximity to the end corrugation land 10 whereby the exhaust pipe 4 extends in an upstream direction from the gasket 18. The exhaust pipe 4 is thus captured in a clamping relation by the gasket upstream section 20b for forming a relatively secure, fluid-tight connection between the exhaust pipe 4 and the flexible hose 8.

III. First Modified Embodiment Exhaust System 102

Figure 2:
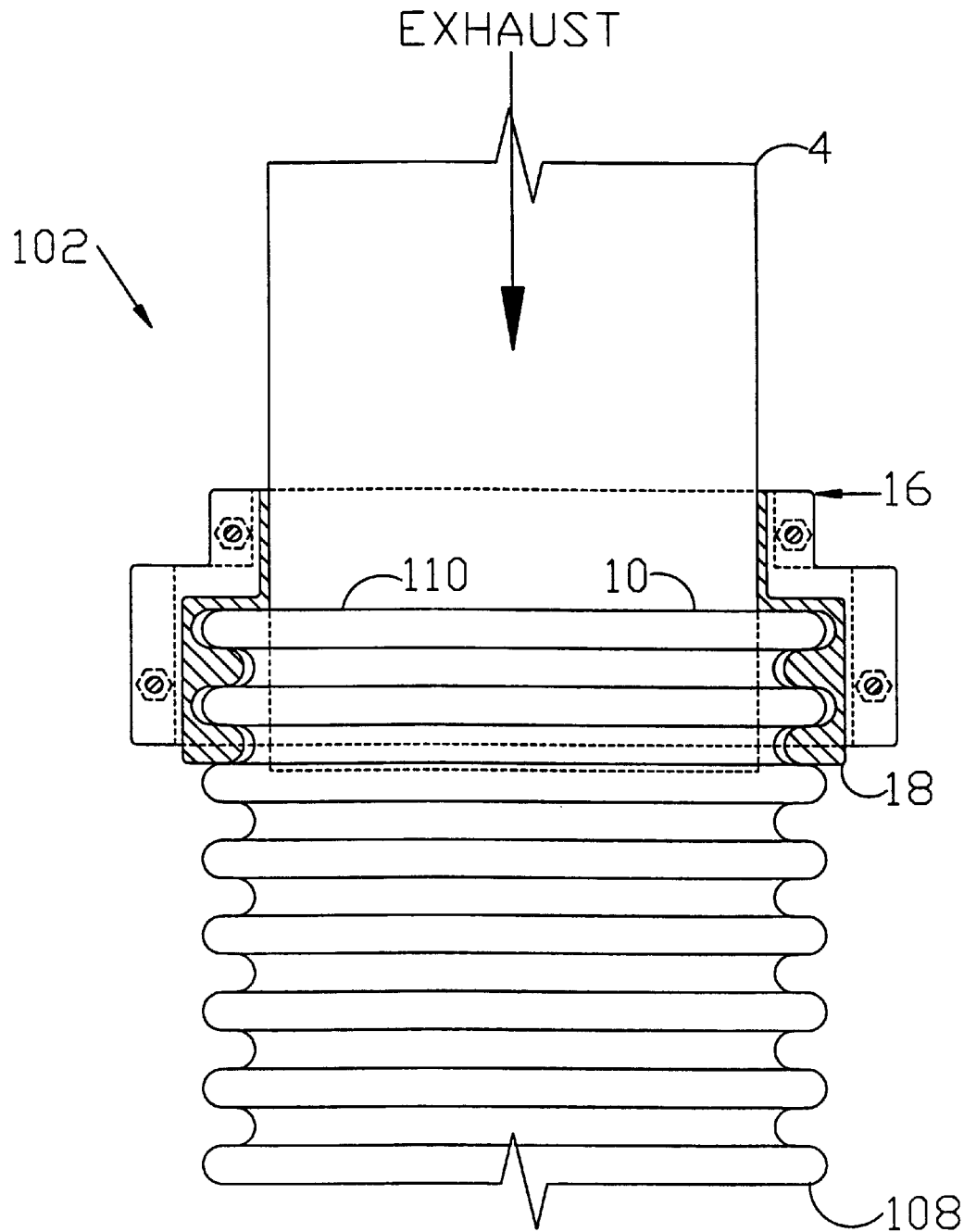
FIG. 2 is an elevational view of a first modified embodiment thereof.

An exhaust system 102 comprising a first modified embodiment of the present invention is shown in FIG. 2 and is generally similar to the exhaust system 2 described above. A flexible hose 108 terminates at an end 114 formed by the last land 10 of the corrugated flexible hose 108. The exhaust pipe 4 is thus secured in a gripping relationship by the gasket 18.

IV. Second Modified Embodiment Exhaust System 202

Figure 3:
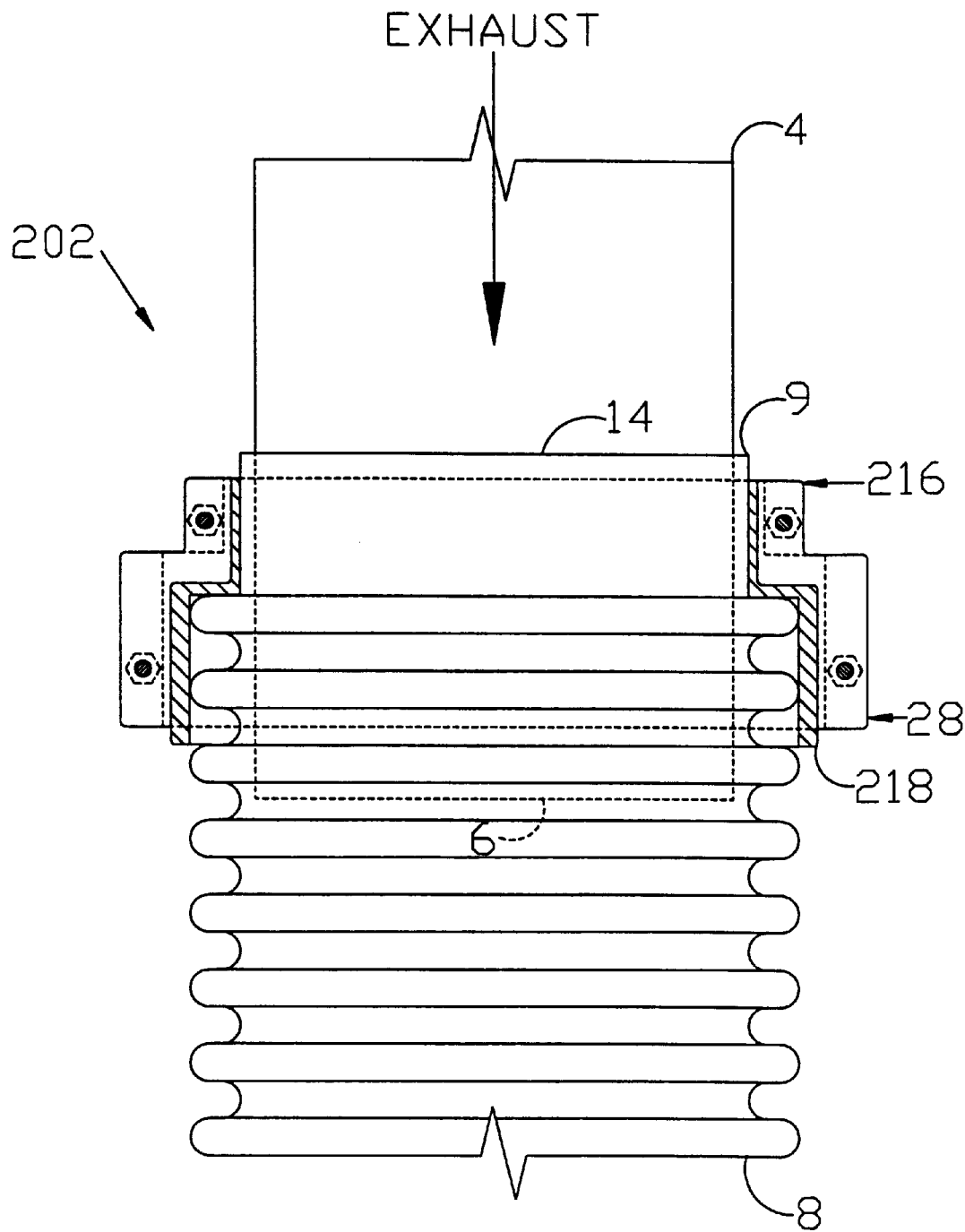
FIG. 3 is an elevational view of a second modified embodiment thereof.

FIG. 3 shows an exhaust system 202 comprising a second modified embodiment of the present invention and including a rigid exhaust pipe 4 with an end 6 connected to a corrugated, flexible hose 8 including a generally cylindrical extension 9 terminating at an end 14. A clamp assembly 216 includes a gasket 218 having a generally smooth-walled bore with downstream and upstream portions respectively. The gasket 218 is clamped in place by a clamp subassembly 28.

V. Third Modified Embodiment Exhaust System 302

Figure 4:
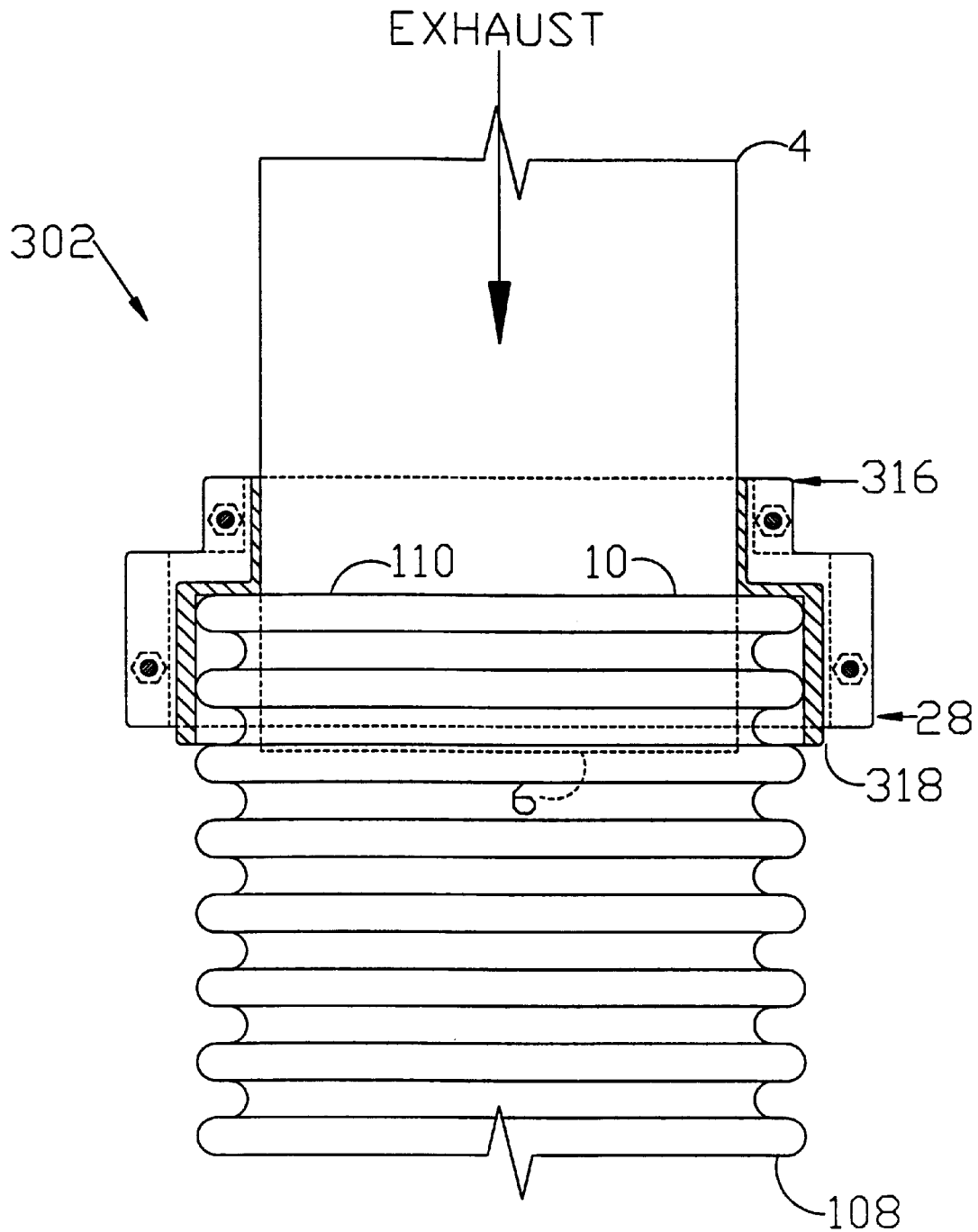
FIG. 4 is an elevational view of a third modified embodiment thereof.

FIG. 4 shows an exhaust system 302 comprising a second modified embodiment of the present invention and including a flexible hose 108 similar to the flexible hose 108 described in connection with the first modified embodiment exhaust system 102 and including an end 110 formed by the last land 10 of the corrugated flexible hose 108. A clamp assembly 316 includes a gasket 318 which is similar to the gasket 218 described in connection with the second modified embodiment exhaust system 202 described above.

VI. Fourth Modified Embodiment Exhaust System 402

Figure 5:
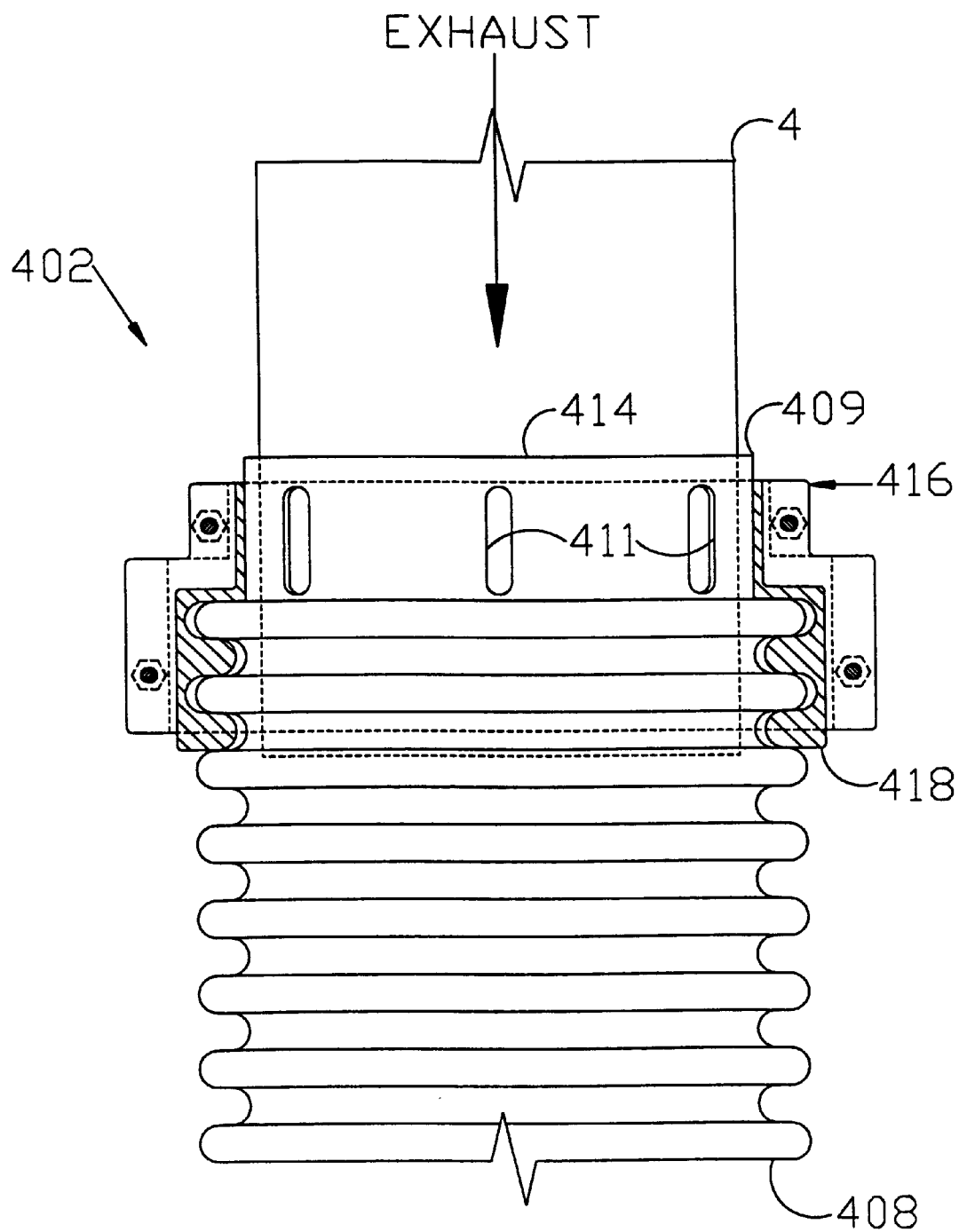
FIG. 5 is an elevational view of a fourth modified embodiment thereof.

FIG. 5 shows an exhaust system 402 comprising a fourth modified embodiment of the present invention and including a flexible hose 408 with an extension 409 having a plurality of regularly spaced, longitudinally-extending captured slots 411 located in proximity to a flexible hose end 414. The slots 411 facilitate constriction of the corrugated flexible hose extension 409 on the rigid exhaust pipe 4.

VII. Fifth Modified Embodiment Exhaust System 502

Figure 6:
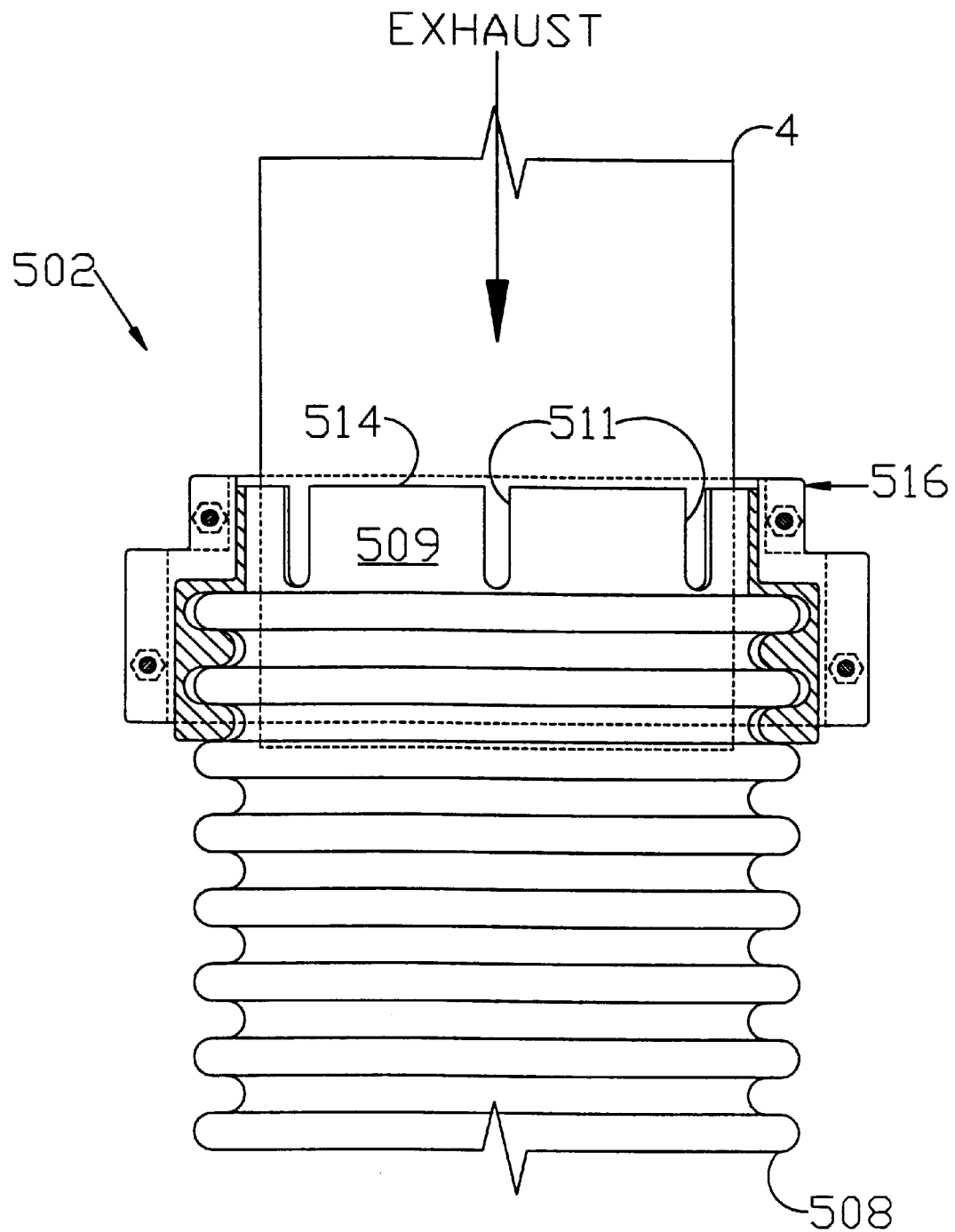
FIG. 6 is an elevational view of a fifth modified embodiment thereof.

FIG. 6 shows an exhaust system 502 comprising a fifth modified embodiment of the present invention. The exhaust system 502 includes a flexible hose 508 with an extension 509 having a plurality of open-ended slots 511 which extend to an end 514 of the flexible hose 508. The open-ended slots 511 function to facilitate constriction of the flexible hose extension 509 on the exhaust pipe 4.

VIII. Sixth Modified Embodiment Exhaust System 602

Figure 7:
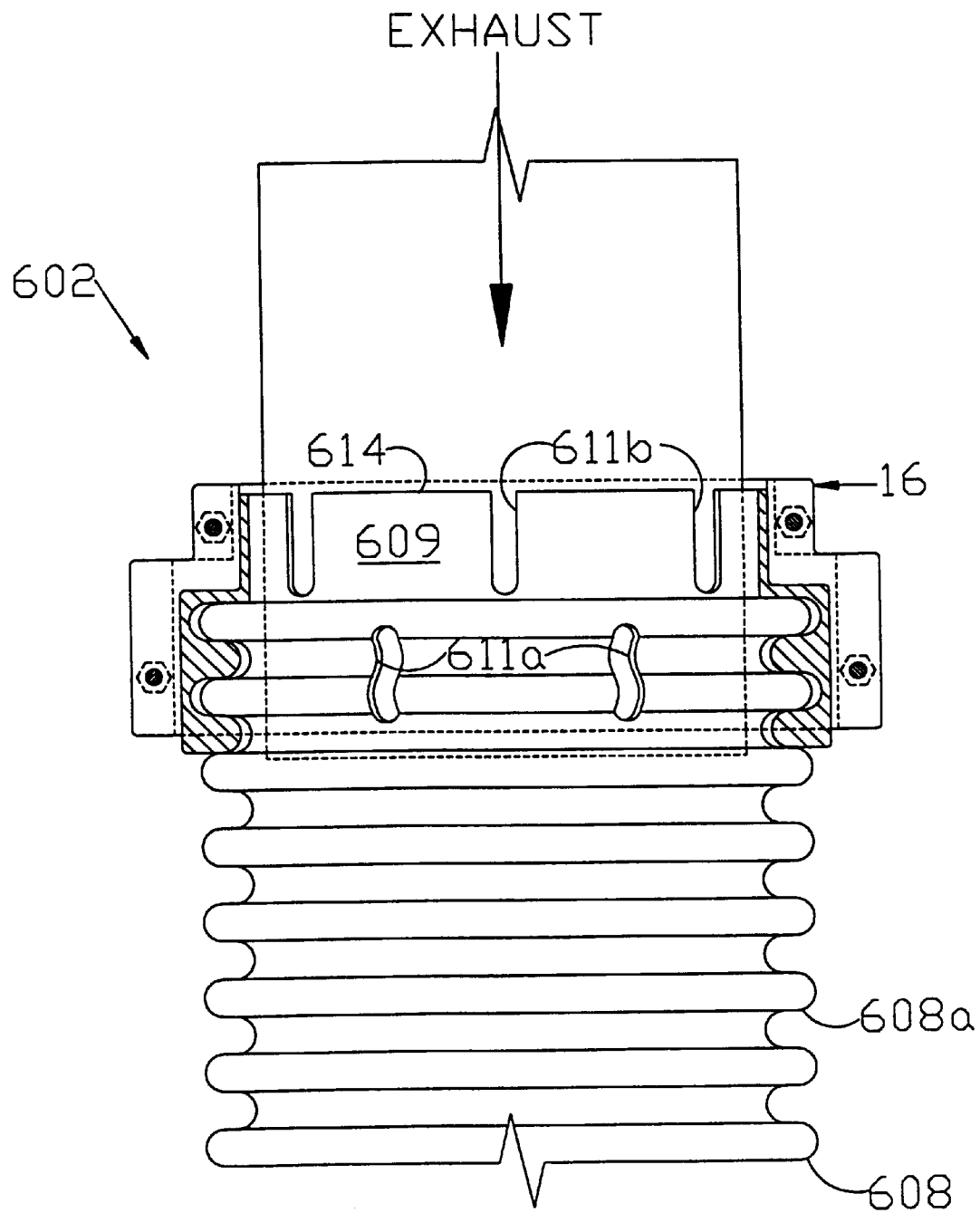
FIG. 7 is an elevational view of a sixth modified embodiment thereof.

A fourth modified embodiment exhaust system 602 is shown in FIG. 7 and includes a plurality of radially-spaced, longitudinally-extending captured slots 611a in a corrugated portion 608a of a flexible hose 608. The flexible hose 608 further includes a plurality of open-ended slots 611b in a flexible hose extension 609 which terminates at a flexible hose end 614. The open-ended slots 611b are open at the flexible hose end 614. The captured and open-ended slots 611a,b respectively function to facilitate gripping the exhaust pipe 4 at both downstream and upstream locations.

IX. Seventh Modified Embodiment Exhaust System 702

Figure 8:
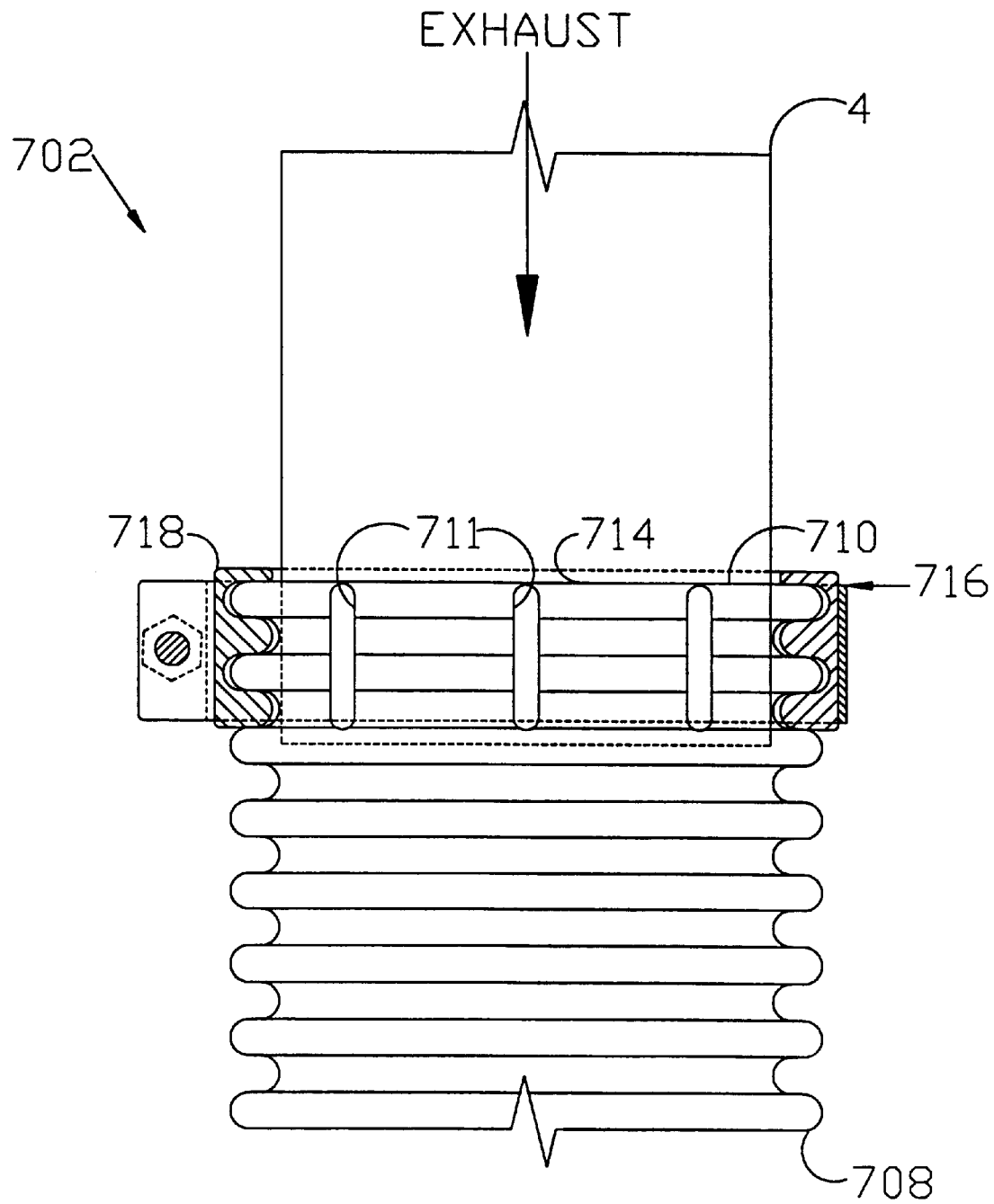
FIG. 8 is an elevational view of a seventh modified embodiment thereof.

FIG. 8 shows an exhaust system 702 comprising a seventh modified embodiment of the present invention and including a flexible hose 708 with an end 714 formed by the last corrugation 710 thereof. A clamp assembly 716 includes a gasket 718. The corrugated flexible hose 708 is received by the gasket 718 with a corresponding corrugated configuration. A plurality of regularly-spaced, longitudinally-extending, closed-end slots 711 are formed in the corrugated hose 708 in proximity to its end 714. The slots 711 accommodate radial constriction and expansion of the flexible hose 708 to facilitate a grip thereof on the exhaust pipe 4.

X. Eighth Modified Embodiment Exhaust System 802

Figure 9:
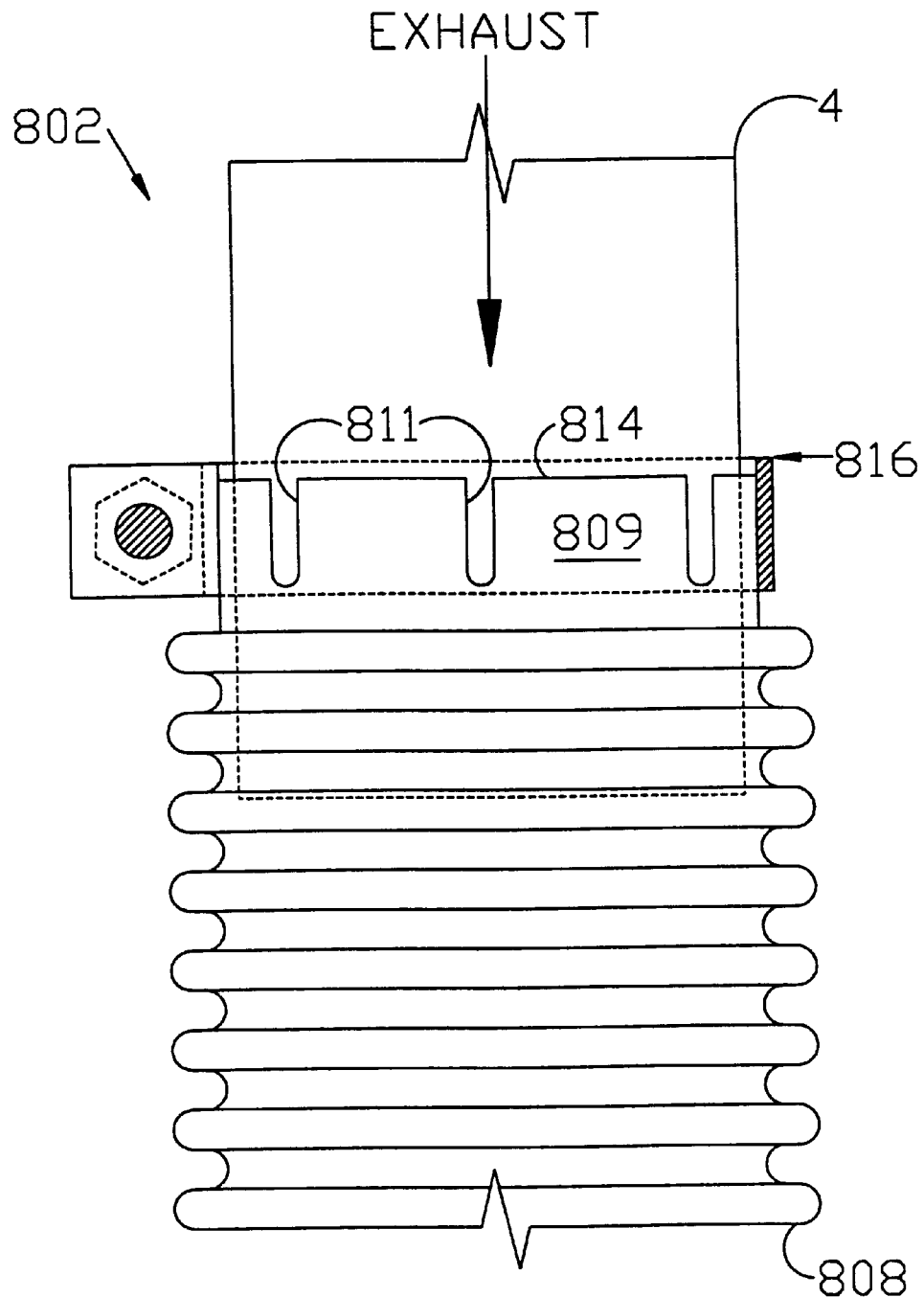
FIG. 9 is an elevational view of an eighth modified embodiment thereof.

FIG. 9 shows an exhaust system 802 comprising an eighth modified embodiment of the present invention. The exhaust system 802 includes a corrugated flexible hose 808 with a smooth-walled extension 809 forming an end 814 of the flexible hose 808. The extension 809 is provided with a plurality of radially-spaced, longitudinally-extending slots 811 which are open at the extension end 814. A clamp 816 encircles the extension 809 and draws the slots 811 together as it tightens to improve the grip on the exhaust pipe 4.

Figure 10:
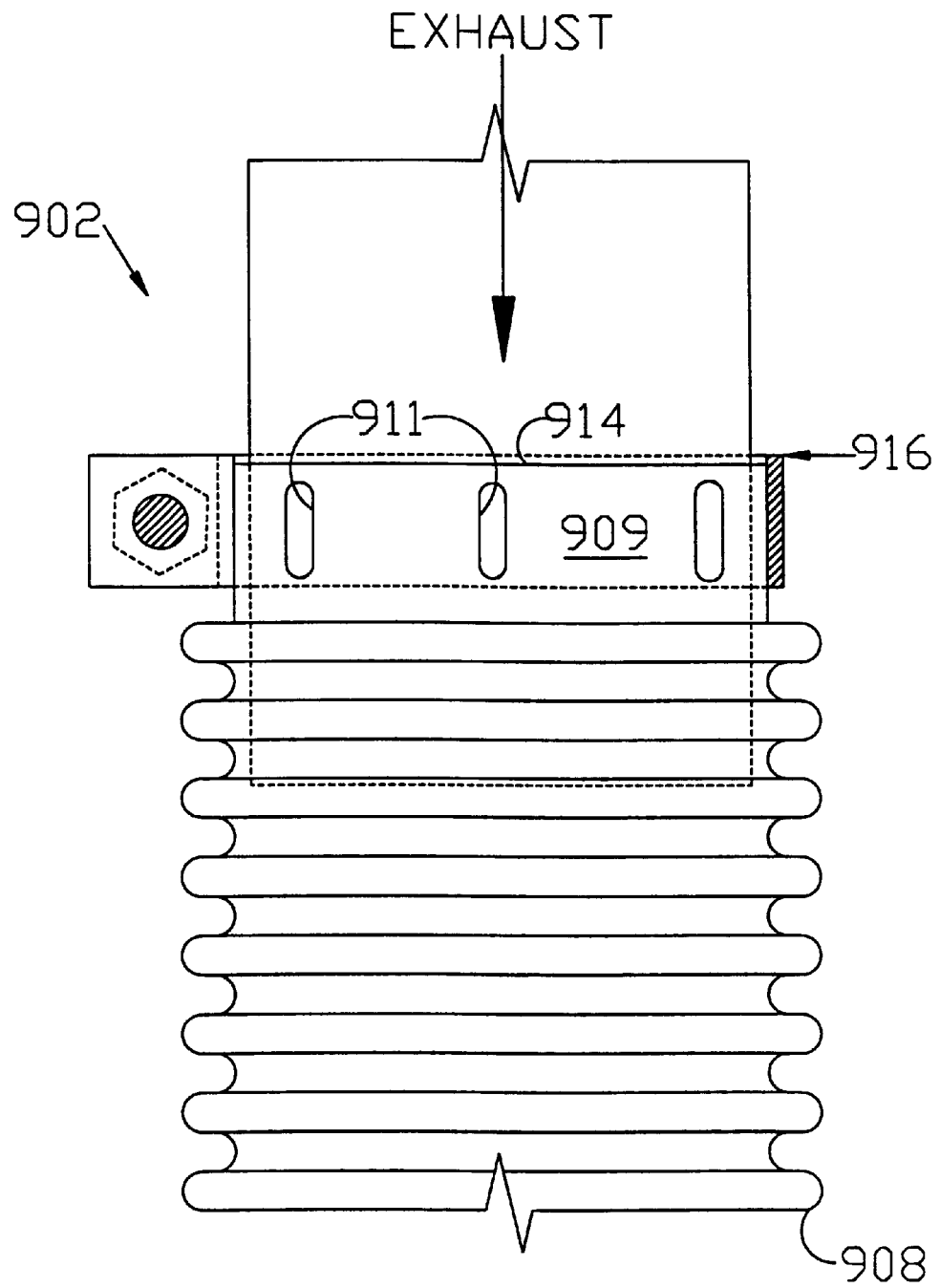
FIG. 10 is an elevational view of a ninth modified embodiment thereof.

FIG. 10 shows an exhaust system 902 comprising a ninth modified embodiment of the present invention and including a flexible hose 908 with a smooth-walled extension 909 terminating at a flexible hose end 914. A plurality of regularly-spaced, closed-end, longitudinally-extending slots 911 are formed in the extension 909 and facilitate gripping the exhaust pipe 4 as the flexible hose extension 909 is contracted by a clamp assembly 916.

It is to be understood that while certain forms of the present invention have been illustrated and described herein, it is not to be limited to the specific forms or arrangement of parts described and shown.

I claim:

1. In combination with a vehicle including an internal combustion engine, the improvement of an exhaust system, which comprises:

a) a rigid exhaust pipe connected to the engine and including a downstream end in spaced relation from the engine;

b) a corrugated, flexible metal hose with an upstream end and a downstream end;

c) a constriction means for constricting said flexible hose in clamping relation on said exhaust pipe;

d) an emission control device connected to the flexible hose downstream end; and e) a clamp assembly, which includes:
      1) a gasket with upstream and downstream ends and a bore extending therebetween, said gasket bore receiving at least one of said exhaust pipe and said flexible hose; and
      2) a band subassembly generally encircling said gasket.

2. The combination according to claim 1 wherein said gasket includes:

a) a downstream section whereat said gasket bore has a corrugated configuration and said gasket has a generally cylindrical outer surface with a first outside diameter; and b) an upstream section whereat said gasket bore is a generally smooth-walled with a cylindrical configuration and a gasket upstream section outer surface with a generally cylindrical configuration and an outside diameter less than the outside diameter of said downstream section.

3. The combination according to claim 2 wherein said band subassembly includes:

a) a pair of halves split longitudinally;

b) each said half having a downstream section with a pair of downstream flanges with downstream receivers and an upstream section with a pair of upstream flanges with upstream receivers;

c) said downstream sections forming a downstream inside diameter corresponding to said gasket downstream portion outside diameter and said upstream sections forming an upstream inside diameter corresponding to said gasket upstream portion outside diameter; and d) said constriction means comprising two pairs of bolts extending through corresponding, opposed pairs of said downstream and upstream end flanges respectively and received in the receivers thereof and two pairs of nuts threadably mounted on said bolts.

4. The combination according to claim 1 wherein said flexible hose includes:

a) an end land located in proximity to said flexible hose upstream end; and b) a generally cylindrical smooth-walled extension extending in an upstream direction from said end land and received in said gasket upstream portion bore.

5. The combination according to claim 2 wherein:

a) said exhaust pipe is grippingly received in said gasket bore at said gasket upstream portion.

6. The combination according to claim 4 wherein said flexible hose includes:

a) a plurality of radially-spaced, longitudinally-extending slots formed in said flexible hose extension.

7. The combination according to claim 6 wherein said slots are closed and are positioned in spaced-relation from said extension end.

8. The combination according to claim 7 wherein said slots extend to and are open at said extension end.

9. The combination according to claim 8, wherein said flexible hose includes a corrugated portion extending in a downstream direction from said end land and further includes a plurality of longitudinally-extending, radially-spaced slots formed in said flexible hose corrugated portion and received within said gasket downstream portion.

10. In combination with a vehicle including an internal combustion engine, the improvement of an exhaust system, which comprises:

a) an exhaust pipe connected to the internal combustion engine and including a downstream end;

b) a flexible, corrugated metal hose including upstream and downstream ends and a corrugated portion including a plurality of alternating lands and grooves;

c) an emission control device connected to said flexible metal hose downstream end; and d) a clamp assembly including:
       1) a gasket with a downstream section and an upstream section, said gasket having a bore with a corrugated configuration at said downstream section and a smooth-walled configuration at said upstream section;
       2) said gasket having an outer surface with a first greater outside diameter at said downstream section and a second, lesser outside diameter at said upstream section;
       3) said gasket having downstream and upstream ends at said downstream and upstream sections respectively;
       4) said gasket forming a shoulder at the outer surface thereof between the gasket downstream and upstream sections;
       5) clamp assembly downstream and upstream ends;
       6) a band subassembly comprising downstream and upstream sections with downstream and upstream band subassembly ends respectively;
       7) said band subassembly including a longitudinally-split pair of band halves each having a pair of end flanges with downstream and upstream flange sections;
       8) each said flange having downstream and upstream receivers aligned with opposed receivers on said other band half with said band subassembly positioned on said gasket;
       9) a band shoulder formed between said band half downstream and upstream sections;
       10) downstream and upstream pairs of bolts respectively received in downstream and upstream pairs of aligned band flange receivers; and
       11) downstream and upstream pairs of nuts respectively threadably mounted on said downstream and upstream bolts.

11. The combination according to claim 10, which includes:

a) said flexible hose corrugated section having an end corrugation adjacent to said flexible hose end; and b) said exhaust pipe being engaged by said gasket upstream section.

12. The combination according to claim 10, which includes:
   a) said flexible hose having an end corrugation captured within said clamp assembly gasket downstream section; and
   b) said flexible hose having a smooth-walled extension extending in an upstream direction from said end corrugation thereof, said flexible hose extension being received in said clamp assembly upstream section and engaged by said gasket upstream section.

* * * * *